(12) United States Patent
Lee

(10) Patent No.: US 6,762,819 B2
(45) Date of Patent: Jul. 13, 2004

(54) LIQUID CRYSTAL DISPLAY DEVICE WITH ELECTRODES ON BARRIER RIBS AND FABRICATING METHOD THEREOF

(75) Inventor: Seung Chul Lee, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 143 days.

(21) Appl. No.: 09/748,870

(22) Filed: Dec. 28, 2000

(65) Prior Publication Data

US 2001/0006409 A1 Jul. 5, 2001

(30) Foreign Application Priority Data

Dec. 31, 1999 (KR) .......................................... P99-68074

(51) Int. Cl.[7] ..................... G02F 1/1337; G02F 1/1343; G02F 1/1339
(52) U.S. Cl. ...................... 349/156; 349/123; 349/139; 345/63; 313/582
(58) Field of Search .............................. 349/143, 156, 349/123, 73, 181; 345/87, 63; 313/582

(56) References Cited

U.S. PATENT DOCUMENTS

| | | | |
|---|---|---|---|
| 3,687,515 A | * 8/1972 | Haas et al. .................... 349/73 |
| 5,517,343 A | * 5/1996 | Yamahara et al. .......... 349/123 |
| 5,694,188 A | * 12/1997 | Sano et al. .................. 349/139 |
| 5,706,109 A | * 1/1998 | Yamada et al. ............. 349/181 |
| 5,852,486 A | * 12/1998 | Hoke, Jr. ..................... 349/156 |
| 6,130,739 A | * 10/2000 | Shimoshikiryo et al. ..... 349/182 |
| 6,147,666 A | * 11/2000 | Yaniv ........................... 345/87 |
| 2002/0024303 A1 | * 2/2002 | Sano et al. .................. 313/582 |
| 2003/0098825 A1 | * 5/2003 | Kim et al. .................... 345/63 |
| 2003/0227427 A1 | * 12/2003 | Kim ............................ 345/60 |

FOREIGN PATENT DOCUMENTS

| JP | 6214244 | * 8/1994 | |
| JP | 2000357459 A | * 12/2000 | ............ H01J/11/02 |

* cited by examiner

*Primary Examiner*—Julie Ngo
(74) *Attorney, Agent, or Firm*—McKenna Long & Aldridge LLP

(57) ABSTRACT

A liquid crystal display (LCD) device has electrodes on barrier ribs that are adaptive for widening a viewing angle and improving an aperture ratio of the LCD device. In the device, barrier ribs are formed from an insulating material at the boundary portion of the pixel cells. First and second electrodes are provided at opposite surfaces of the barrier ribs to apply an electric field to the liquid crystal. Accordingly, the viewing angle can be widened and the electrode area can be minimized, thereby improving the aperture ratio and the light transmissivity.

30 Claims, 13 Drawing Sheets

LIQUID CRYSTAL DISPLAY DEVICE WITH ELECTRODES ON BARRIER RIBS AND FABRICATING METHOD THEREOF

This application claims the benefit of Korean Patent Application No. 1999-68074, filed on Dec. 31, 1999, which is hereby incorporated by reference for all purposes as if fully set forth herein.

BACKGROUND OF THE INVENTION

1. Field of the Invention

The present invention relates to a liquid crystal display device, and more particularly to a liquid crystal display device with electrodes on barrier ribs that is adaptive for widening a viewing angle and improving an aperture ratio.

2. Discussion of the Related Art

Generally, an active matrix liquid crystal display (LCD) of active matrix driving system uses thin film transistors (TFT's) as switching devices to display a natural moving picture. Since such a liquid crystal display can be made into a smaller-size device than the Brown tube or cathode ray tube (CRT), it is commercially available for a monitor such as a portable television or a lap-top personal computer, etc.

The active matrix LCD displays a picture corresponding to video signals, such as television signals, on a pixel (or picture element) matrix having pixels arranged at each intersection between gate lines and data lines. Each pixel includes a liquid crystal cell for controlling a quantity of transmitted light in accordance with a voltage level of a data signal from a data line. The TFT is installed at an intersection between the gate line and the data line to switch a data signal to be transferred to the liquid crystal cell in response to a scanning signal (i.e., a gate pulse) from the gate line.

Such a liquid crystal display device (LCD) can be largely classified into a twisted nematic (TN) mode, in which a vertical electric field is applied, and an in-plane switching (IPS) mode, in which a horizontal electric field is applied to have a wide viewing angle, depending on a direction of an electric field driving a liquid crystal.

In a TN mode LCD as shown in FIG. 1, a TFT 30 is provided at an intersection between a data line 22 and a gate line 24, and pixel electrodes 20 are arranged in a matrix type at a pixel area between the data line 22 and the gate line 24. As shown in FIG. 2, the TFT 30 is provided on a rear substrate 2. The TFT 30 includes a gate electrode 4 connected to the gate line 24, a source electrode 14 connected to the data line 22, and a drain electrode 16 connected to the pixel electrode 20. A gate insulating film 6 made from $SiN_x$ or $SiO_x$, etc. is entirely deposited on the rear substrate 2 in which the gate electrode 4 is patterned. A semiconductor layer 8 made from amorphous silicon (a-Si) and an ohmic contact layer 10 made from a-Si doped with n+ions are sequentially disposed on the gate insulating film 6 in such a manner to cover the gate insulating film 6 on the gate electrode 4. A source electrode 14 and a drain electrode 16 made from a metal are formed on the ohmic contact layer 10. The source and drain electrodes 14 and 16 are patterned in such a manner to be spaced by a predetermined channel width from each other. Subsequently, the ohmic contact layer 10 is etched along a channel defined between the source electrode 14 and the drain electrode 16 to expose the semiconductor layer 8. A protective film 18 made from $SiN_x$ or $SiO_x$, etc. is entirely deposited on the rear substrate 2 to cover the TFT 30. The protective film 18 on the drain electrode 16 is etched away to define a contact hole 12. The contact hole 12 and the pixel area are deposited with indium tin oxide (ITO) to connect the pixel electrode 20 to the drain electrode 16.

As, shown in FIG. 3, the rear substrate 2 provided with the TFT array is opposed to a front substrate 62 provided with black matrices 64, color filters 66, and a common electrode 68 of ITO with having a liquid crystal layer 70 therebetween. A gate high pulse is applied to the gate electrode 4 of the TFT, thereby applying an electric field corresponding to a difference voltage between a video data voltage and a common voltage between the pixel electrode 20 and the common electrode 68 opposed vertically to each other during a scanning interval when a channel is defined between the source electrode 14 and the drain electrode 16. The liquid crystals of the liquid crystal layer 70 is driven with the vertical electric field to control a quantity of light input from a back light.

Such a TN mode LCD has a drawback in that, since liquid crystal within the pixel cell has a large difference in refractive index and transmissivity depending on an observed angle, the viewing angle is limited. On the other hand, the IPS mode LCD has an advantage in the viewing angle since liquid crystal within the pixel cell is rotated on a basis of horizontal direction by a horizontal electric field.

In an IPS mode LCD as shown in FIG. 4, a TFT 50 is provided at an intersection between a data line 52 and a gate line 54, and pixel electrodes 48 are arranged in a matrix type at a pixel area between the data line 52 and the gate line 54. As shown in FIG. 5, the TFT 50 is provided on a rear substrate 32. The TFT 50 includes a gate electrode 34 connected to the gate line 54, a source electrode 42 connected to the data line 52, and a drain electrode 44 connected to the pixel electrode 48. The gate electrode 34 and a common electrode 35 are formed on the rear substrate 32 by depositing a metal such as chrome (Cr), etc. and then patterning it. Herein, the common electrode 35 is patterned into a stripe shape within a pixel cell area. A gate insulating film 36 made from $SiN_x$ or $SiO_x$, etc. is entirely deposited on the rear substrate 32 provided with the gate electrode 34 and the common electrode 35. A semiconductor layer 38 made from amorphous silicon (a-Si) and an ohmic contact layer 40 made from a-Si doped with n+ions are sequentially disposed on the gate insulating film 36 in such a manner as to cover the gate insulating film 36 on the gate electrode 34. The source electrode 42 and the drain electrode 44 made from a metal are formed on the ohmic contact layer 40. The source and drain electrodes 42 and 44 are patterned in such a manner as to be spaced by a predetermined channel width from each other. Then, ITO is deposited on the drain electrode 44 and the gate insulating film 36 and thereafter patterned to form the pixel electrode 48. Herein, the pixel electrode 48 is connected to the drain electrode 44 and is patterned into a stripe shape in such a manner as to be alternated with the common electrode 35 within the pixel cell area. Subsequently, the ohmic contact layer 40 is etched along a channel defined between the source electrode 42 and the drain electrode 44 to expose the semiconductor layer 38. A protective film 46 made from $SiN_x$ or $SiO_x$, etc. is entirely deposited on the rear substrate 32 to cover the TFT 50.

As shown in FIG. 6, the rear substrate 32 provided with the TFT array is opposed to a front substrate 72 provided with black matrices 74 and color filters 76, with a liquid crystal layer 78 therebetween. A gate high pulse is applied to the gate electrode 34 of the TFT, thereby applying an electric field corresponding to a difference voltage between a video data voltage and a common voltage between the pixel electrode 48 and the common electrode 35 opposed horizontally to each other during a scanning interval when a channel is defined between the source electrode 42 and the drain electrode 44. A liquid crystal of the liquid crystal layer 78 is driven with the horizontal electric field to control a quantity of a light input from a back light.

However, the IPS mode LCD has an advantage in that it can achieve a wide viewing angle, but has a disadvantage in that, since the area occupied by the electrodes within the pixel cell area, particularly the common electrode 35 made from a metal is large, it has a low aperture ratio and transmissivity. The IPS mode LCD, as well as the TN mode LCD, has such a limitation in the aperture ratio and transmissivity caused by the electrode area as mentioned above. As the area of the electrode made from ITO or a metal is more enlarged so as to apply a strong enough electric field to drive the liquid crystal, the aperture ratio and the transmissivity become lower. Furthermore, the conventional TN mode and IPS mode LCD's have a problem in that, since a single pixel cell has to occupy more than a certain area in consideration of an area occupied by the electrodes, it is difficult to improve the resolution.

SUMMARY OF THE INVENTION

Accordingly, the present invention is directed to a liquid crystal display device with electrodes on barrier ribs and a method of fabrication thereof that substantially obviates one or more of the problems due to limitations and disadvantages of the related art.

An object of the present invention is to provide a liquid crystal display device with electrodes on barrier ribs that is adaptive for widening the viewing angle of the display as well as improving the aperture ratio of the liquid crystal cells.

Additional features and advantages of the invention will be set forth in the description which follows, and in part will be apparent from the description, or may be learned by practice of the invention. The objectives and other advantages of the invention will be realized and attained by the structures particularly pointed out in the written description and claims hereof as well as the appended drawings.

To achieve these and other advantages and in accordance with the purpose of the present invention, as embodied and broadly described, a liquid crystal display is provided having first and second electrodes to define pixel cells and a barrier member at the boundary portion of the pixel cells, the first and second electrodes being formed in a vertical structure between the first and second substrates;.

A liquid crystal display device fabricating is also provided which includes: preparing first and second substrates; forming first and second electrodes to define pixel cells, the first and second electrodes being formed with a vertical shape between the first and second substrates; and forming a barrier member at the boundary portion of the pixel cells.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
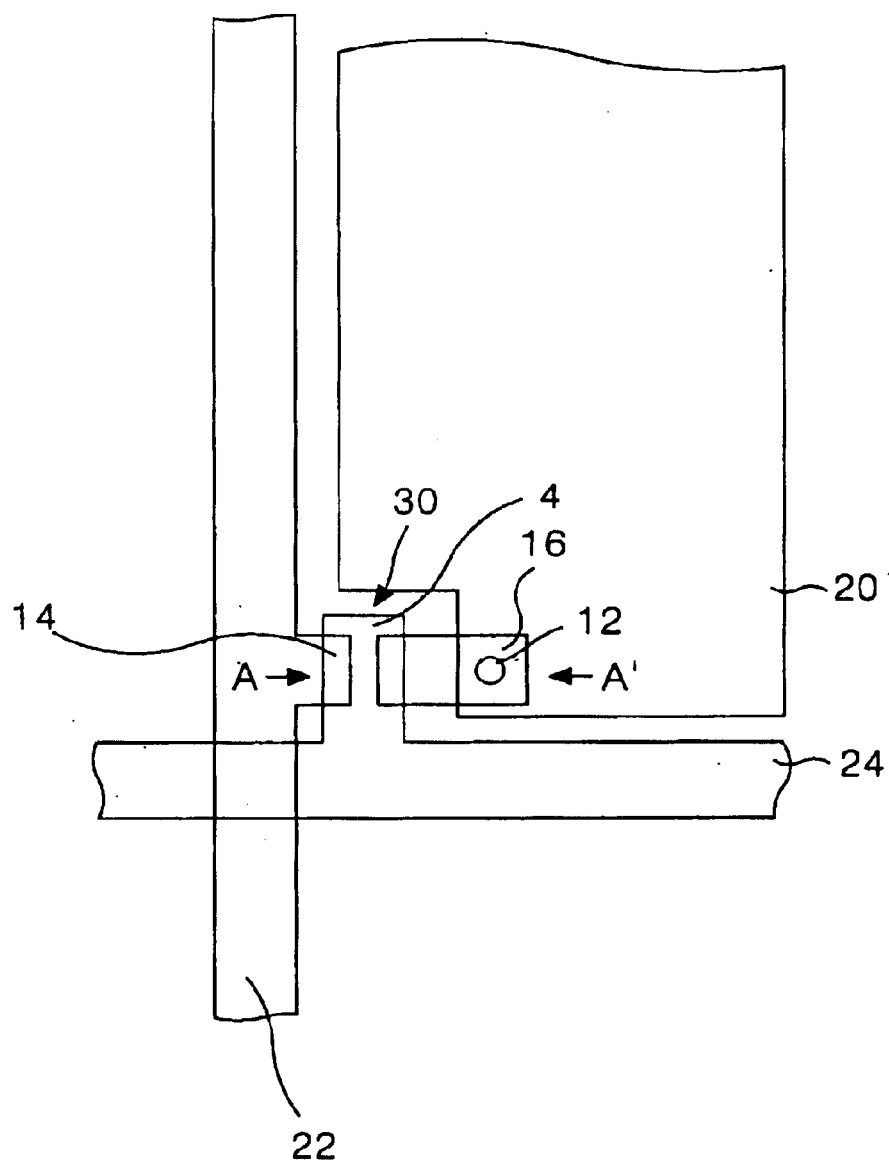
FIG. 1 is a plan view showing a structure of a conventional TN mode liquid crystal display device.
Figure 2:
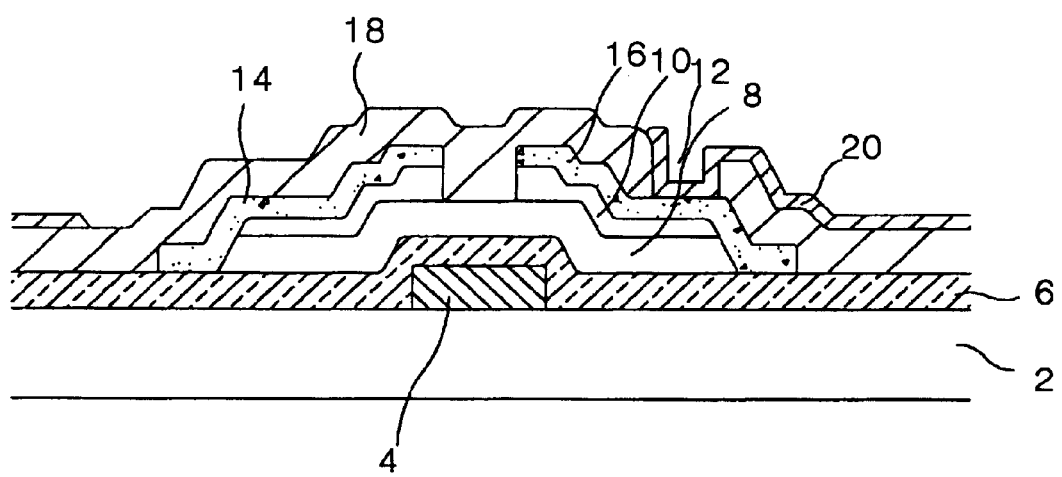
FIG. 2 is a section view of the thin film transistor taken along the A–A' line in FIG. 1.
Figure 3:
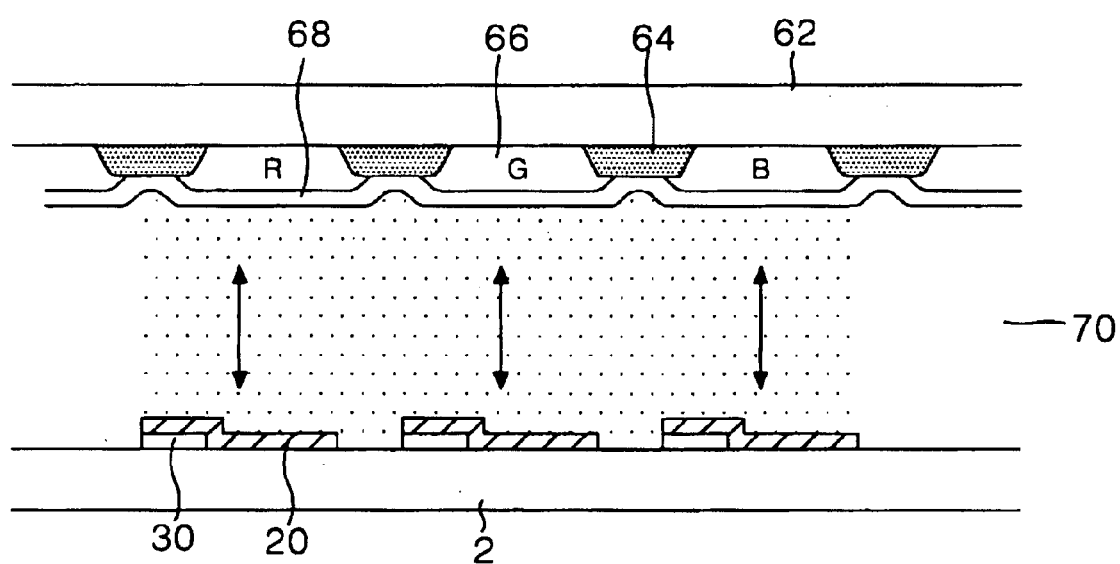
FIG. 3 is a section view representing a direction of an electric field applied to liquid crystals in the TN mode liquid crystal display device of FIG. 1.
Figure 4:
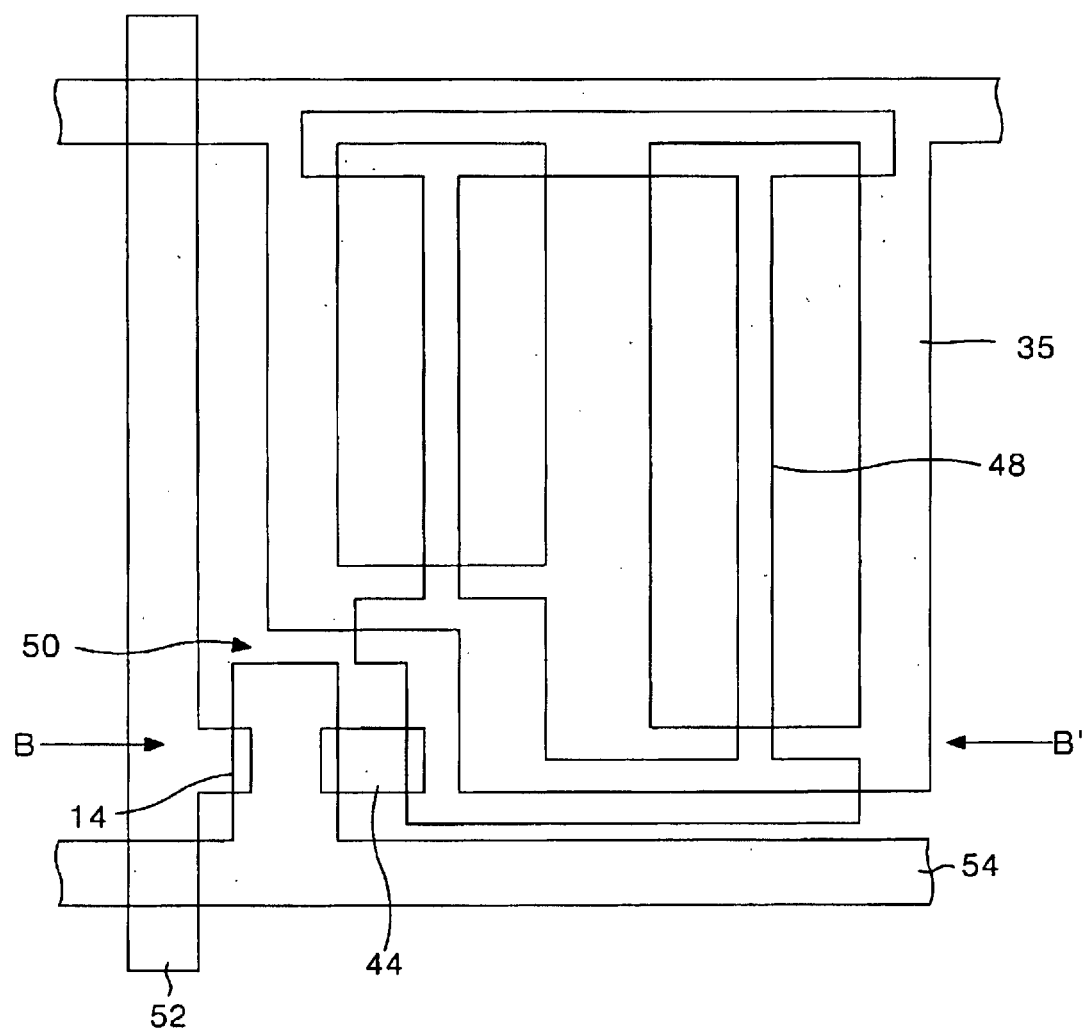
FIG. 4 is a plan view showing a structure of a conventional IPS mode liquid crystal display device.
Figure 5:
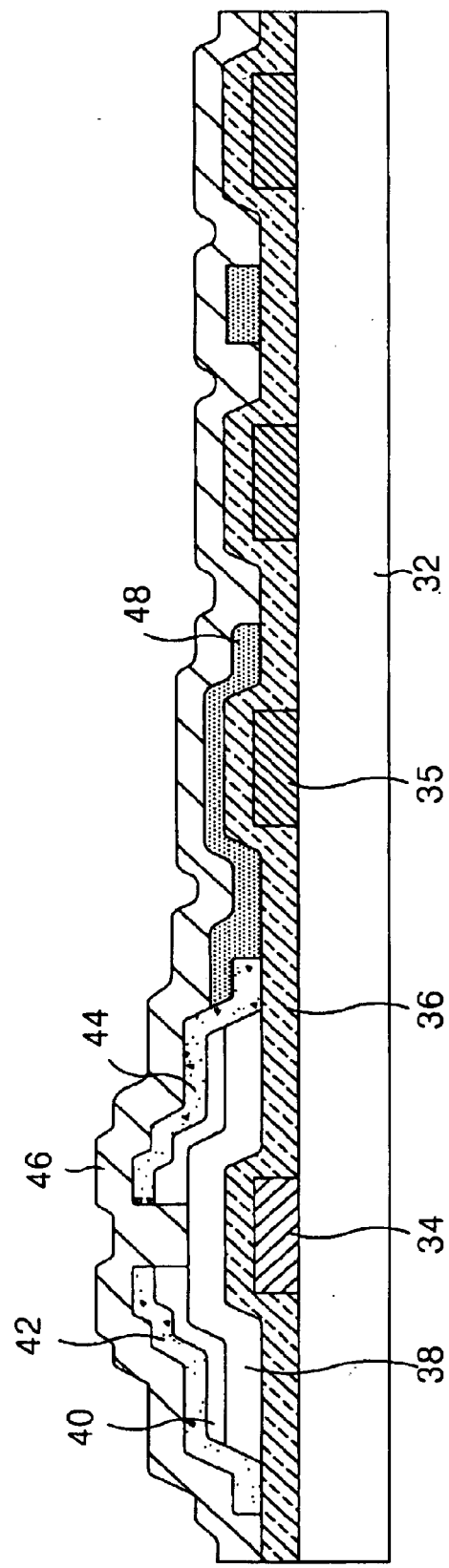
FIG. 5 is a section view of the thin film transistor taken along the B-B' line in FIG. 4.
Figure 6:
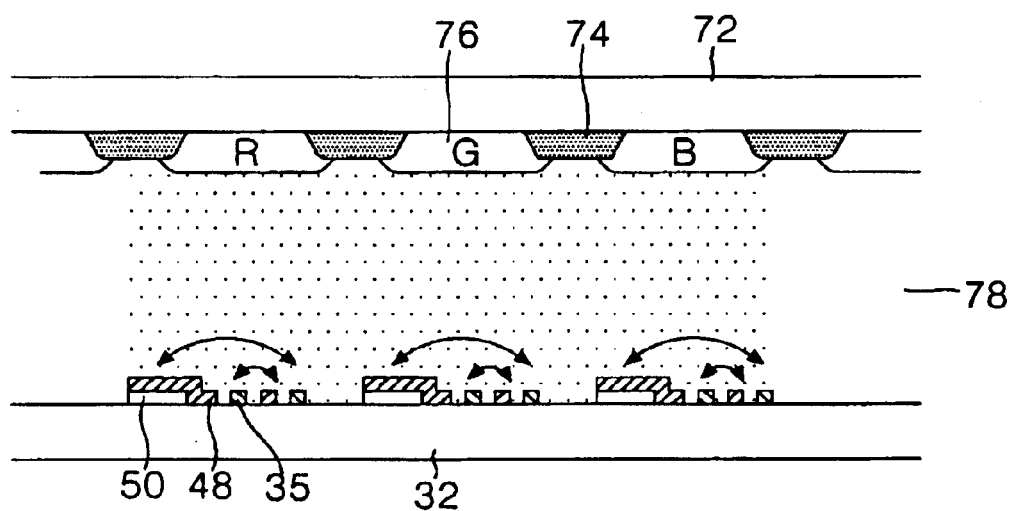
FIG. 6 is a section view representing a direction of an electric field applied to liquid crystals in the IPS mode liquid crystal display device of FIG. 4.
Figure 7:
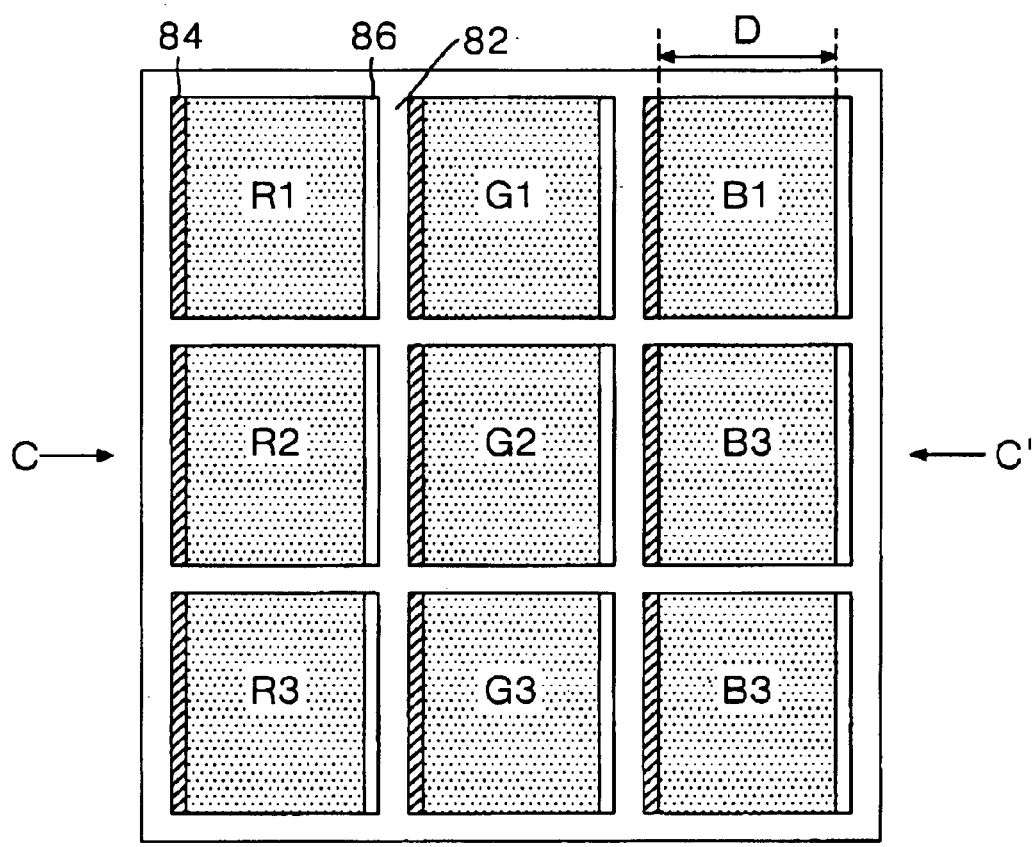
FIG. 7 is a plan view showing a structure of a liquid crystal display device with electrodes on barrier ribs according to a first embodiment of the present invention.

Referring to FIG. 7 and FIG. 8, there is shown a liquid crystal display device according to a first embodiment of the present invention. The liquid crystal display device includes barrier ribs 82 surrounding four sides of each pixel cell, and first and second electrodes 84 and 86 formed at the opposite surfaces of the barrier ribs 82 within the pixel cell. The barrier ribs 82 are provided at the boundary portions of the pixel cells in such a manner as to surround the respective pixel cells for displaying red, green and blue colors. An insulating material is used for the barrier ribs 82 so as to prevent a short or a electrical interference between the electrodes 84 and 86 formed at each side of the barrier rib 82. The barrier ribs 82 are extended vertically between a front substrate 86 provided with black matrices 88 and color filters 90 and a rear substrate 94. A liquid crystal material 92 is injected into each space surrounded with the barrier ribs 82. The first and second electrodes 84 and 86 are made from a conductive material. Any one of the electrodes 84 and 86 is used as a common electrode to which a common voltage is applied while the other thereof is used as a data electrode to which video data is supplied.

Figure 9A:
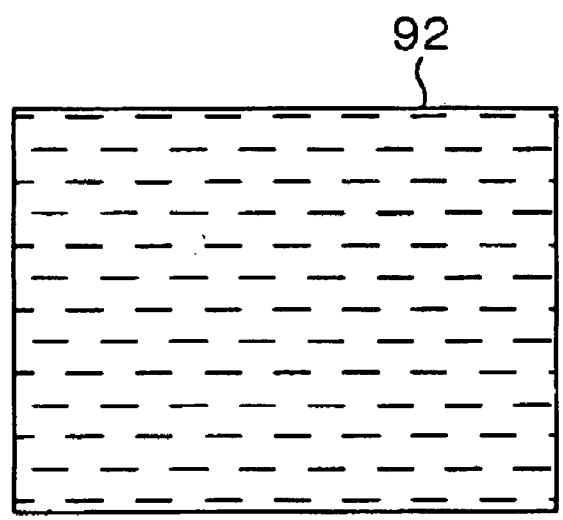
FIG. 9 illustrates a liquid crystal driving direction of a liquid crystal pixel cell shown in FIG. 7.
Figure 9B:
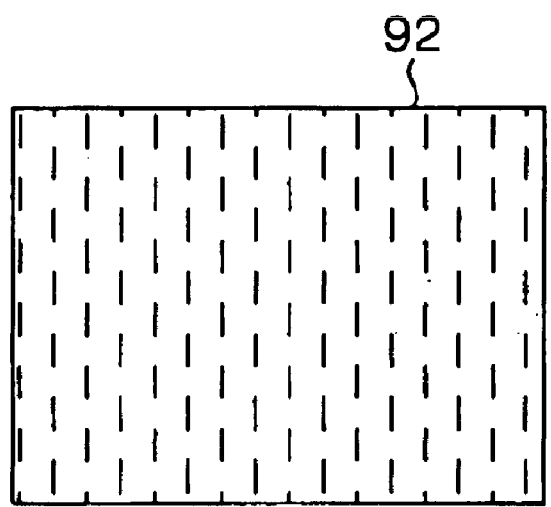

If a video data voltage and a common voltage are applied to each of the first and second electrodes 84 and 86, then a horizontal electric field is applied to the liquid crystal 92 to rotate it around a vertical axis. Thus, the liquid crystal 92 goes from a state as shown in FIG. 9A into a state as shown in FIG. 9B, or vice versa, to control a transmissivity of an incident light. The liquid crystal 92 is driven with a horizontal electric field to widen the viewing angle as well as to reduce the area occupied by the electrodes within the pixel cell, so that the aperture ratio and light transmissivity can be increased. Furthermore, a distance D between the electrodes is narrowed to such an extent as to correspond to the increase in the aperture ratio and light transmissivity, so that the resolution can be improved.

Figure 8A:
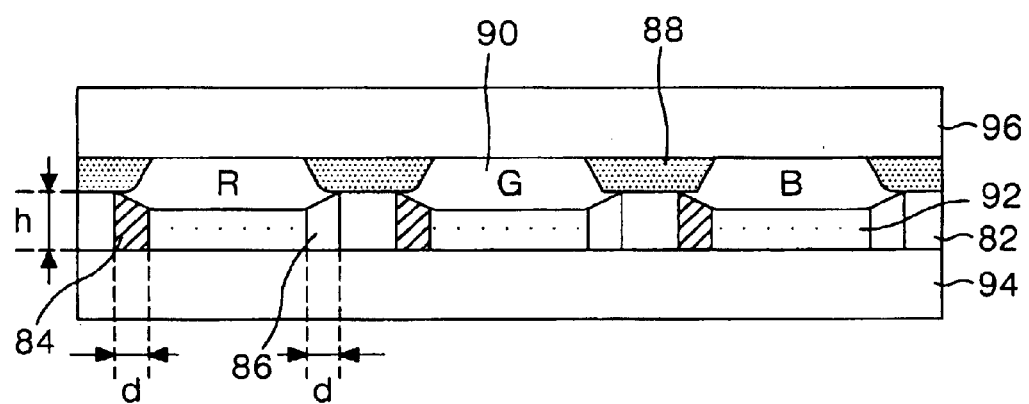
FIGS. 8A and 8B are section views of the liquid crystal display device taken along the C–C' line in FIG. 7.
Figure 8B:
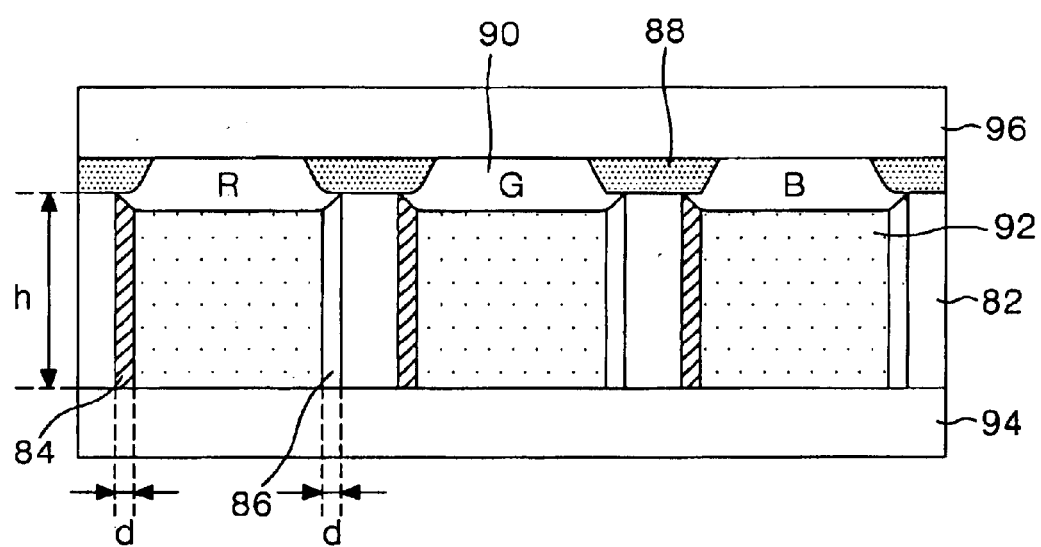

A height h of the first or second electrodes 84 or 86 is set to be equal to or larger than a thickness d thereof (h>d), as shown in FIGS. 8A and 8B, respectively. And the height of the barrier ribs 82 is set to be equal to or larger than a thickness thereof.

Meanwhile, when the liquid crystal display device shown in FIG. 7 is driven in an active matrix type, scanning electrode lines supplied with a scanning signal and switching devices driving the pixel cells in response to the scanning signal must be installed. For instance, when the pixel cells are driven with TFT's, a gate electrode line supplying the scanning signal is provided for each scanning line at each pixel cell. Also, the source electrode of the TFT is connected to any one of the first and second electrodes 84 and 86, and the drain electrode thereof is connected to the other of the electrodes 84 or 86.

Figure 10:
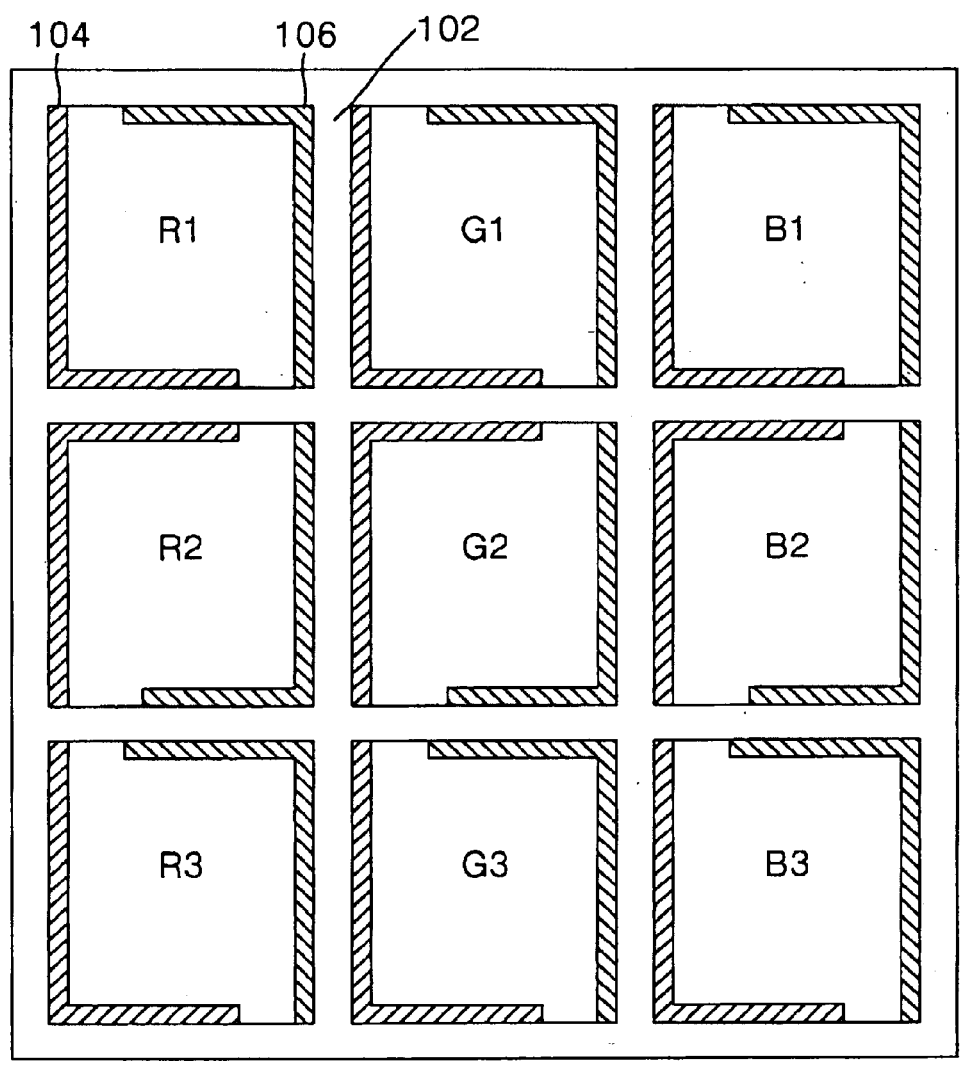
FIG. 10 is a plan view showing a structure of a liquid crystal display device with electrodes on barrier ribs according to a second embodiment of the present invention.

Referring to FIG. 10, there is shown a liquid crystal display device according to a second embodiment of the present invention. The liquid crystal display device includes barrier ribs 102 surrounding four sides of each pixel cell, and first and second electrodes 104 and 106 formed at the vertical surfaces of the opposed barrier ribs 82 within the pixel cell. The barrier ribs 102 are formed in a lattice shape at the boundary portions of the pixel cells in such a manner as to surround the respective pixel cells for displaying red, green and blue colors. An insulating material is selected for the barrier ribs 102 so as to prevent a short or an electrical interference between the electrodes 104 and 106 formed at the vertical surfaces of the barrier ribs 102. The barrier ribs 102 are extended vertically between a front substrate 86 and a rear substrate 94 as shown in FIG. 8. A liquid crystal material 92 is injected into each space surrounded by the barrier ribs 102. Any one of the electrodes 104 and 106 is used as a common electrode to which a common voltage is applied while the other electrode is used as a data electrode to which video data is supplied. The first and second electrodes 104 and 106 are supplied with voltage signals having a polarity contrary to each other. The first and second electrodes 104 and 106 are provided at four sides of the barrier rib 102 in such a manner to be symmetrical to the vertical surfaces of the barrier rib 102 in a diagonal direction. The first and second electrodes 104 and 106 may have the same orientation within red, green and blue pixel cells adjacent each other in a traverse, or row direction, whereas the first and second electrodes 104 and 106 may have an alternately inverted orientation within color pixel cells adjacent to each other in a longitudinal, or column direction. For instance, the first electrode 104 within the red, green and blue pixel cells arranged in the first row are formed equally at the left surface and the lower surface of the four surfaces of the barrier rib 102 surrounding the pixel cell. The first electrode 104 within the odd-numbered red pixel cells of the red pixel cells arranged in the first column is provided at the left surface and the lower surface of the four surfaces of the barrier rib 102 On the other hand, the first electrode 104 within the even-numbered red pixel cells of the red pixel cells arranged in the first column is formed at the left surface and the upper surface of the barrier rib 102 in such a manner as to be opposed to the lower side of the first electrode 104 within the odd-numbered red pixels having the barrier rib therebetween.

Figure 11:
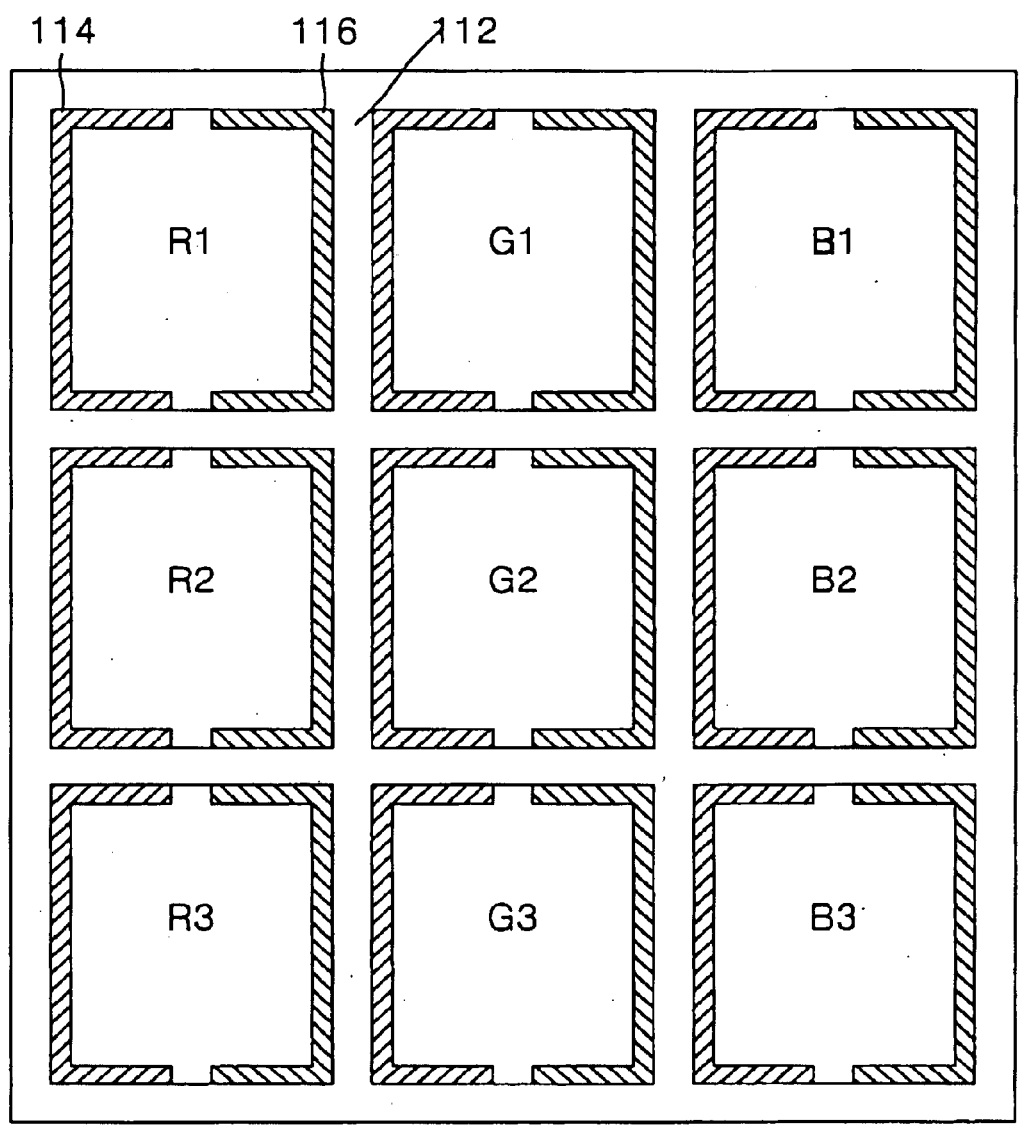
FIG. 11 is a plan view showing a structure of a liquid crystal display device with electrodes on barrier ribs according to a third embodiment of the present invention.

Referring to FIG. 11, there is shown a liquid crystal display device according to a third embodiment of the present invention. The liquid crystal display device includes barrier ribs 112 surrounding four sides of each pixel cell, and first and second electrodes 114 and 116 formed at three surfaces of the opposed barrier ribs 112 within the pixel cell in such a manner to be spaced by a desired gap for their mutual insulation. The barrier ribs 112 are formed in a lattice shape at the boundary portions of the pixel cells in such a manner as to surround the respective pixel cells for displaying red, green and blue colors. An insulating material is selected for the barrier ribs 112 so as to prevent a short or an electrical interference between the electrodes 114 and 116 formed at the vertical surfaces of the barrier rib 112. The barrier ribs 112 are extended vertically between a front substrate 86 and a rear substrate 94 as shown in FIG. 8. Liquid crystal material 92 is injected into each space surrounded by the barrier ribs 112. Any one of the electrodes 114 and 116 is used as a common electrode to which a common voltage is applied while the other electrode is used as a data electrode to which video data is supplied. The first and second electrodes 114 and 116 are supplied with voltage signals having the polarity contrary to each other. The first and second electrodes 114 and 116 are provided at the surfaces of the barrier rib 112 in such a manner as to be symmetrical to each other in the left and right direction. The first electrode 114 is provided at the left surface of the four surfaces of the barrier rib 112 and at a portion of the left sides of the upper and lower surfaces thereof. The second electrode 116 is provided at the right surface of the four surfaces of the barrier rib 112 surrounding the pixel cell, and is provided at a portion of the right sides of the upper and lower surfaces thereof in such a manner as to be opposed to the first electrode 114 with a desired gap therebetween.

In the liquid crystal display devices as shown in FIG. 10 and FIG. 11, the electrode area is minimized to improve the aperture ratio and the light transmissivity. Also, the alignment directions of the liquid crystal at the center and the periphery of the pixel cell are different from each other when a horizontal electric field is applied to the liquid crystal and a voltage signal is applied to the first and second electrodes 104 and 114 or 106 and 116. Therefore, the viewing angle can be increased. Such liquid crystal display devices can be driven in an active matrix system by the addition of switching devices and scanning electrode lines.

As described above, according to the present invention, the barrier ribs of an insulating material are provided between the liquid crystal pixel cells, and electrodes are provided at the front side and the rear side of the barrier rib. Thus, an electric field is applied to the liquid crystal in the horizontal direction to differentiate an alignment direction of the liquid crystal at the center and the periphery of the liquid crystal cell, so that the viewing angle can be increased. Also, the electrode area is minimized, so that the aperture ratio and the light transmissivity can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device comprising:
  first and second substrates having liquid crystal material therebetween;
  first and second electrodes, the first and second electrodes defining pixel cells and being formed vertically between the first and second substrates; and
  a barrier member formed as a lattice to surround each of the pixel cells.

2. The device of claim 1, wherein the barrier member extends vertically between the first and second substrates.

3. The device of claim 1, wherein the first substrate has a black matrix formed thereon, and wherein the barrier member extends from the second substrate to the black matrix.

4. The device of claim 1, wherein the barrier member includes an insulating material.

5. The device of claim 1, wherein the pixel cells include a red pixel cell, a green pixel cell, and a blue pixel cell.

6. The device of claim 1, wherein a height of the first electrode is equal to a thickness of the first electrode.

7. The device of claim 1, wherein a height of the first electrode is greater than a thickness of the first electrode.

8. The device of claim 1, wherein the first and second electrodes are provided at opposite surfaces of the barrier member.

9. The device of claim 1, wherein the first and second electrodes are formed at vertical surfaces of the barrier member.

10. The device of claim 1, wherein the first and second electrodes have a same shape adjacent to each other in a row direction.

11. The device of claim 1, wherein an orientation of the first and second electrodes in pixel cells adjacent to each other in a column direction is alternately inverted.

12. The device of claim 1, wherein the first and second electrodes are formed at left and right surfaces of the barrier member, respectively.

13. The device of claim 1, wherein the first and second electrodes have different polarities from each other.

14. The device of claim 1, wherein each pixel cell comprises a switching device connected to one of the first and second electrodes for switching a video data signal.

15. The device of claim 14, wherein the switching device is a thin film transistor (TFT).

16. A method of fabricating a liquid crystal display (LCD) device comprising:

providing first and second substrates;

forming first and second electrodes, the first and second electrodes defining pixel cells and being formed vertically between the first and second substrates; and forming a barrier member formed as an undivided lattice to surround each of the pixel cells.

17. The method of claim 16, wherein the barrier member extends vertically between the first and second substrates.

18. The method of claim 16, further comprising forming a black matrix on the first substrate, and wherein the barrier member extends from the second substrate to the black matrix.

19. The method of claim 16, wherein the barrier member includes an insulating material.

20. The method of claim 16, wherein the pixel cells include a red pixel cell, a green pixel cell, and a blue pixel cell.

21. The method of claim 16, wherein a height of the first electrode is equal to a thickness of the first electrode.

22. The method of claim 16, wherein a height of the first electrode is greater than a thickness of the first electrode.

23. The method of claim 16, wherein the first and second electrodes are provided at opposite surfaces of the barrier member.

24. The method of claim 16, wherein the first and second electrodes are formed at vertical surfaces of the barrier member.

25. The method of claim 16, wherein the first and second electrodes have a same shape adjacent to each other in a row direction.

26. The device of claim 16, wherein an orientation of the first and second electrodes in pixel cells adjacent to each other in a column direction is alternately inverted.

27. The method of claim 16, wherein the first and second electrodes are formed at left and right surfaces of the barrier member.

28. The method of claim 16, wherein the first and second electrodes have different polarities from each other.

29. The method of claim 16, further comprising providing within each pixel cell a switching device connected to one of the first and second electrodes for switching a video data signal.

30. The method of claim 29, wherein the switching device is a thin film transistor.

* * * * *